G. SCHOETTINGER.
COMPENSATING DEVICE FOR SPRING SCALES.
APPLICATION FILED JAN. 27, 1911.
994,036.
Patented May 30, 1911.
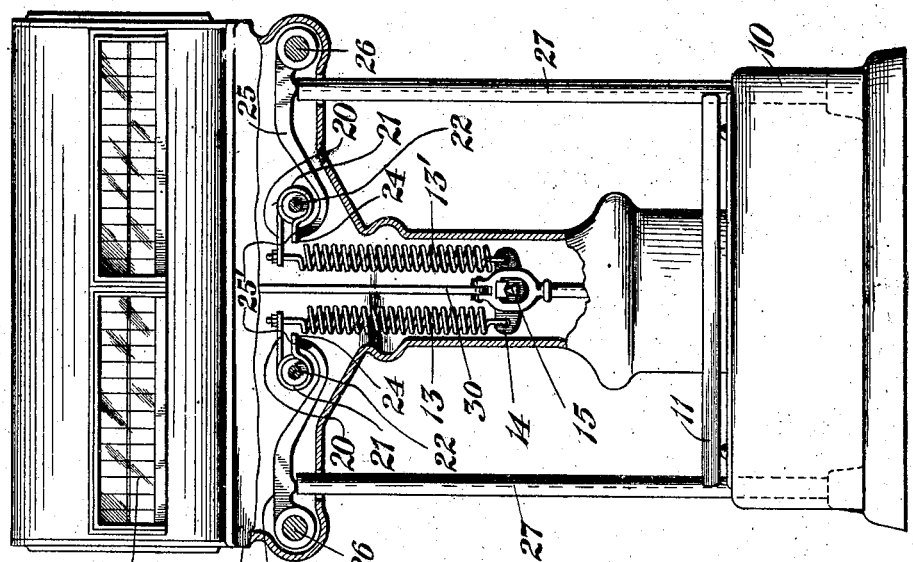
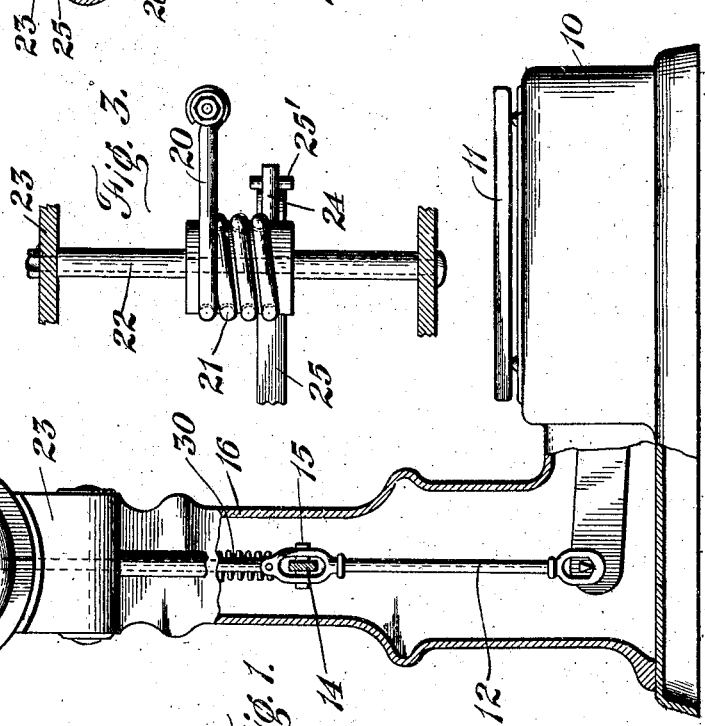
Witnesses
Chas. W. Stauffiger.
Franck E. Ernst
Inventor
GEORGE SCHOETTINGER.
By
Attorneys

UNITED STATES PATENT OFFICE.

GEORGE SCHOETTINGER, OF DETROIT, MICHIGAN.

COMPENSATING DEVICE FOR SPRING-SCALES.

994,036. Specification of Letters Patent. Patented May 30, 1911.

Application filed January 27, 1911. Serial No. 604,951.

*To all whom it may concern:*

Be it known that I, GEORGE SCHOETTINGER, a citizen of the United States of America, residing at Detroit, in the county of Wayne and State of Michigan, have invented certain new and useful Improvements in Compensating Devices for Spring-Scales, of which the following is a specification, reference being had therein to the accompanying drawings.

This invention relates to spring scales, and has for its object the provision of means whereby the correct weighing is not affected by changes in the tension of the balance spring resulting from variations in temperature.

To this end the invention consists in adding to the usual balance spring of the scale a compensating spring the tension of which under temperature changes increases and decreases inversely to that of the balance spring all as more fully hereinafter described and illustrated in connection with a spring scale of the computing type in which, Figure 1 is a side view of a computing scale embodying my invention; Fig. 2 is a front view thereof; and Fig. 3 is a plan view of the spring support detached.

In the drawings 10 represents the base, 11 the platform, 12 the tension rod, 13—13' the balance springs, 14 the equalizing bar, 15 the knife edge joint of said bar with the tension rod, 16 the supporting column of the frame, 23 the part of the frame supported on the column and inclosing the drum and 31 the sight opening therein, all the aforesaid parts being of known construction and operation.

In applying my invention to this type of scale I suspend each of the balance springs from the end of an arm 20 extending from one end of a coil 21 formed of spring wire. This coil is loosely mounted upon a plug 22 which is supported in a fixed bearing in the upper part 23 of the frame. The other end of this coil is also extended to form an arm 24 against which the free end of a lever 25 bears. This lever 25 is fulcrumed at 26 in the frame 23 and is upheld by a rod 27 of such material as may be most compatible with the desired expansion and contraction under different degrees of temperature, this rod being stepped in the base 10 so that a fairly substantial length of expansion rod may be provided.

In practice both springs being supported in like manner, a variable factor is thereby added to the tension of the weighing springs, and this variable factor is the varying torsional strain to which the springs 21 are subjected under varying degrees of temperature. Thus with an increase of temperature the expansion of the rods acting upon the levers bears with increased force upon the arms 24 and since the coils are loosely coiled upon the supporting plugs the increased pressure will be transmitted as an increased torsional strain of the compensating springs, the latter varying inversely to the varying tension of the balance springs produced by the changes in temperature.

While I have shown no means for adjusting the index hand of the scale to zero, it is to be understood that the scale is provided with such means as in the usual construction and suitable means may also readily be provided for adjusting the torsion of the spring 21.

Some of the coils of the spring 21 adjacent to the arm 24 may be tightly coiled upon the supporting plug and the plug may be journaled in bearings, and other forms of torsion springs may be substituted all of which I consider to be within the scope of my invention. It is also obvious that my invention may be applied equally as well to the suspension type of spring scales.

What I claim as my invention is:—

1. In a temperature compensating device for spring scale, the combination with the frame having bearings and weighing mechanism, of a torsion spring supported in said bearings, a variable abutment for said spring at one end and means for controlling said variable abutment by changes of temperature and a connection suspending the balance spring from the other end of the torsion spring.

2. In a temperature compensating device for spring scale, the combination with the frame having bearings and weighing mechanism, of a torsion spring supported in said bearings and provided with arms at opposite ends holding said spring under torsion, one of said arms carrying the balance spring, and a variable abutment for the other arm and means for controlling said variable abutment by changes of temperature.

3. In a temperature compensating device for spring scale, the combination with the frame having bearings and weighing mechanism, of a torsion spring supported in said bearings and provided with arms at opposite ends holding said spring under torsion, one of said arms carrying the balance spring, a lever fulcrumed in the frame and forming with its free end an abutment for the other arm of the torsion spring and an expansion rod controlling the movement of said lever.

4. In a temperature compensating device for spring scale the combination with the frame and balance spring, of a torsion spring supported in the frame and interposed between the same and the point of suspension of the balance spring and means adapted to increase and decrease the torsion of said spring inversely to that of the balance spring resulting from changes in temperature.

In testimony whereof I affix my signature in presence of two witnesses.

GEORGE SCHOETTINGER.

Witnesses:
 GEO. PERKINS,
 OTTO F. BARTHEL.